(12) United States Patent
Musser et al.

(10) Patent No.: US 11,213,051 B2
(45) Date of Patent: Jan. 4, 2022

(54) MILK REPLACER PRODUCTS CONTAINING HALIDES AND SOURCES OF HYDROGEN PEROXIDE AND METHODS OF FEEDING SAME

(71) Applicant: PURINA ANIMAL NUTRITION LLC, Shoreview, MN (US)

(72) Inventors: Robert C. Musser, Woodbury, MN (US); Bill L. Miller, Labadie, MO (US)

(73) Assignee: Purina Animal Nutrition LLC, Arden Hill, MN (US)

( * ) Notice: Subject to any disclaimer, the term of this patent is extended or adjusted under 35 U.S.C. 154(b) by 24 days.

(21) Appl. No.: 14/322,604

(22) Filed: Jul. 2, 2014

(65) Prior Publication Data
US 2016/0000104 A1    Jan. 7, 2016

(51) Int. Cl.
*A23K 20/147* (2016.01)
*A23K 20/20* (2016.01)
*A23K 20/189* (2016.01)
*A23K 20/163* (2016.01)
*A23K 20/10* (2016.01)
*A23K 50/10* (2016.01)
*A23K 50/60* (2016.01)

(52) U.S. Cl.
CPC ............ *A23K 20/147* (2016.05); *A23K 20/10* (2016.05); *A23K 20/163* (2016.05); *A23K 20/189* (2016.05); *A23K 20/20* (2016.05); *A23K 50/10* (2016.05); *A23K 50/60* (2016.05)

(58) Field of Classification Search
CPC .. A23K 1/1893; A23K 1/1813; A23K 20/189; A23K 20/163; A23K 20/147; A23K 20/20; A23K 20/10; A23K 50/60; A23K 50/10; A23K 50/50; A23C 9/1522; C12Q 1/28
USPC ................. 426/2, 61, 588, 801, 807; 435/28
See application file for complete search history.

(56) References Cited

U.S. PATENT DOCUMENTS

| | | | |
|---|---|---|---|
| 2,125,398 A | 8/1938 | Reichert et al. | |
| 2,808,332 A * | 10/1957 | Anderson | A23K 50/15 426/69 |
| 4,378,376 A | 3/1983 | Wagner | |
| 4,504,471 A * | 3/1985 | Takagi | A61P 43/00 514/4.8 |
| 4,614,653 A | 9/1986 | Kakade | |
| 4,617,190 A * | 10/1986 | Montgomery | A23C 9/1213 426/588 |
| 4,961,934 A | 10/1990 | Iwasaki et al. | |
| 5,085,873 A | 2/1992 | Degre | |
| 5,100,679 A | 3/1992 | Delrue | |
| 5,580,592 A | 12/1996 | Nassauer et al. | |
| 5,607,681 A | 3/1997 | Galley et al. | |
| 5,668,299 A | 9/1997 | Debonte | |
| 5,747,078 A | 5/1998 | De Jong et al. | |
| 5,756,132 A | 5/1998 | Rebhan | |
| 5,785,990 A | 7/1998 | Langrehr | |
| 5,792,501 A | 8/1998 | Lepine | |
| 5,795,602 A * | 8/1998 | Craig | A23K 50/60 426/2 |
| 5,830,511 A * | 11/1998 | Mullerat | A01N 59/00 424/661 |
| 5,861,187 A | 1/1999 | Debonte | |
| 5,962,062 A | 10/1999 | Carrie et al. | |
| 6,165,532 A * | 12/2000 | Mutti | A23C 3/037 426/511 |
| 6,348,223 B1 | 2/2002 | Claycamp | |
| 6,541,047 B1 | 4/2003 | Claycamp et al. | |
| 7,001,741 B1 * | 2/2006 | Tanzer | C12Q 1/28 435/28 |
| 7,709,033 B2 | 5/2010 | Kvist et al. | |
| RE43,929 E | 1/2013 | Miller | |
| 8,349,313 B2 | 1/2013 | Smith et al. | |
| 9,668,500 B2 | 6/2017 | Miller | |
| 2002/0018828 A1 | 2/2002 | Lepine | |
| 2002/0119136 A1* | 8/2002 | Johansen | A01N 63/00 424/94.4 |
| 2004/0180126 A1* | 9/2004 | Kies | A61K 31/20 426/601 |
| 2005/0171367 A1 | 8/2005 | Deloach | |

(Continued)

FOREIGN PATENT DOCUMENTS

| CA | 2323581 | 10/1999 |
|---|---|---|
| CN | 101 049 116 A | 10/2007 |

(Continued)

OTHER PUBLICATIONS

Russell NJ et al. in Food Preservatives ISBN 0-306-47736-X (2003).*
MM vs ppm retrieved fro Internet , Jun. 2016.*
Riley et al. entitled "Penetration of hydrogen peroxide from contact lenses or tear—side solution into the aqueous humor", in Optom Vis Sci. 68:7,546-551, 1991.*
"Nursing Formula Select". Available online at www.masterfeeds.com on Sep. 2, 2011.
"Milk Balancer Can Help When Feeding Wasting Milk", DairyBusiness East, Feb. 2015, p. 12, www.dairybusiness.com.

(Continued)

*Primary Examiner* — Bhaskar Mukhopadhyay
(74) *Attorney, Agent, or Firm* — Dorsey & Whitney LLP

(57) ABSTRACT

Methods involve feeding young animals milk products containing milk-based protein, a halide and a source of hydrogen peroxide, where an active lactoperoxidase system is not present in the milk product fed to the young animal, in response to ingesting the milk product, the young animal decreases a feed to gain ratio. Milk replacers may be provided as the milk product, and the young animals may be calves. Milk replacers contain milk-derived protein, a source of hydrogen peroxide at about 50 to about 500 parts per million by weight of the rehydrated milk replacer and iodide at about 1 to about 50 parts per million by weight of the rehydrated milk replacer, where an active lactoperoxidase system is not present.

18 Claims, 1 Drawing Sheet

(56) References Cited

U.S. PATENT DOCUMENTS

| | | |
|---|---|---|
| 2006/0159728 A1 | 7/2006 | Miller |
| 2006/0289354 A1 | 12/2006 | Zhou et al. |
| 2007/0036840 A1 | 2/2007 | Tuduri et al. |
| 2007/0036850 A1 | 2/2007 | Tuduri et al. |
| 2007/0134369 A1 | 6/2007 | Mazeris |
| 2007/0203802 A1 | 8/2007 | Medo |
| 2008/0026036 A1 | 1/2008 | Miller et al. |
| 2008/0026101 A1 | 1/2008 | Nickel et al. |
| 2008/0118615 A1 | 5/2008 | Hartmann et al. |
| 2009/0016990 A1* | 1/2009 | Alberte ............... A61K 31/185 424/85.5 |
| 2009/0253790 A1 | 10/2009 | Smith et al. |
| 2009/0317378 A1 | 12/2009 | Perraudin |
| 2010/0221386 A1 | 9/2010 | Buysse et al. |
| 2010/0278967 A1 | 11/2010 | Cresp |
| 2011/0201081 A1 | 8/2011 | Kensch et al. |
| 2011/0229598 A1 | 9/2011 | Musser |
| 2012/0329118 A1* | 12/2012 | Solomon ................ C12P 7/06 435/165 |
| 2013/0280369 A1 | 10/2013 | Mill |
| 2014/0147548 A1 | 5/2014 | Miller et al. |
| 2015/0257413 A1 | 9/2015 | Miller |
| 2016/0249640 A1 | 9/2016 | Olson et al. |
| 2016/0249641 A1 | 9/2016 | Olson |
| 2017/0173066 A1 | 6/2017 | Miller |
| 2017/0202928 A1 | 7/2017 | Miller et al. |
| 2017/0231254 A1 | 8/2017 | Miller |

FOREIGN PATENT DOCUMENTS

| | | |
|---|---|---|
| CN | 101 703 171 | 5/2010 |
| CN | 101 911 981 | 12/2010 |
| CN | 102 132 766 | 7/2011 |
| CN | 102805263 | 12/2012 |
| CN | 103 271 091 | 9/2013 |
| EP | 0 229 938 | 7/1987 |
| EP | 0282663 | 12/1991 |
| EP | 0642740 | 6/2001 |
| EP | 1637880 | 3/2006 |
| EP | 1 815 754 | 8/2007 |
| EP | 1815754 A1 | 8/2007 |
| GB | 2345836 A | 7/2000 |
| JP | 7089863 | 10/1995 |
| JP | 2509932 | 6/1996 |
| JP | 3145829 | 3/2001 |
| JP | 2002-544212 | 12/2002 |
| JP | 2004-236552 | 8/2004 |
| KR | 2010-0101091 | 9/2010 |
| WO | 99/49740 A1 | 10/1999 |
| WO | WO 2000/069267 | 11/2000 |
| WO | WO 2002/056879 | 7/2002 |
| WO | 2007015937 A1 | 2/2007 |
| WO | WO 2007/106452 | 9/2007 |
| WO | 2011055387 A2 | 5/2011 |
| WO | WO 2011/055387 | 5/2011 |
| WO | WO 2011/061756 | 5/2011 |
| WO | WO 2015/160818 | 10/2015 |

OTHER PUBLICATIONS

"A Guide to Calf Milk Replacers—Types, Use and Quality", Bovine Alliance on Management & Nutrition, 2008.

Anonymous: "Jersey Blend—Cow's match—Calf growth formula", Jan. 1, 2004 (Jan. 1, 2004), Mar. 2013, (Mar. 2013), XP55194288, Retrieved from the Internet: URL:http://www.lolmilkreplacer.com/stellen/groups/pubiic/documents/web_content/ecmp2-0186429.pdf.

Campbell, R. E., et al. "The use of lactoperoxidase for the bleaching of fluid whey." *Journal of Dairy Science* 95.6 (2012): 2882-2890.

Dumitrascu, Loredana et al. "Thermal Inactivation of Lactoperoxidase in Goat, Sheep and Bovine Milk—A Comparative Kinetic and Thermodynamic Study", Journal of Food Engineering 113 (2012) 47-52.

Extended European Search Report dated Jun. 26, 2015 for EP Application No. 1515943.3, 9 pages.

Fathi, M.H. et al., "The effect of vanilla flavoured calf starter on performance of Holstein calves", Journal of Animal and Feed sciences, 2009, vol. 18, pp. 412-419.

Hills R et al: "Effects of Milk Replacer Composition on Growth, Body Composition, and Nutrient Excretion in Preweaned Holstein Heifers", Journal of Dairy Science, American Dairy Science Association, US, vol. 91, No. 8, Aug. 1, 2008 (Aug. 1, 2008), pp. 3145-3155.

Jim Drackley, "Replacing Milk-Derived Proteins and Carbohydrates in Milk Replacer", University of Illinois at Urbana-Champaign, Department of Animal Sciences, May 29, 2013.

K. J. Touchette, M. L. O'Brien, and J. A. Coalson, "Liquid Egg as an Alternative Protein Source in Calf Milk Replacers", J. Dairy Sci. 86:2622-2628, 2003.

Langendijk et al., "Effects of pre- and postnatal exposure to garlic and aniseed flavour on pre- and postweaning feed intake in pigs", Livestock Science, Elsevier, Amsterdam, NL, vol. 108, No. 1-3, Apr. 29, 2007 (Apr. 29, 2007), pp. 284-287.

Luis Alberto Nabté-Solís, "Effect of β-Mannanase Enzyme Addition To Soy-Containing Milk Replacers on Growth and Health of Neonatal Dairy Calves", Thesis Presented to the Faculty of the Graduate School of Cornell University, Jan. 2009.

Montoro, C. et al., "Effect of flavoring a starter in a same manner as a milk replacer on intake and performance of calves", Animal Feed Science and Technology, Feb. 28, 2011, vol. 164, pp. 130-134.

Mullan, W.M.A. (2003). "Manufacture of milk powders containing a functional LP system." [On-line]. Available from: http://www.dairyscience.info/exploitation-of-anti-microbial-proteins/168-lactoperoxidase-system.html. Accessed: Jan. 10, 2014. Revised Aug. 2009.

New Dairy Calf Production Products that can Increase Your Profit by Milk Specialties Global Naimal Nutrition, PM Primer™, PM Balancer™, p. 83, downloaded from www.progressivedairy.com on Mar. 5, 2015.

Oostindjerm et al., "Prenatal flavor exposure affects growth, health and behavior of newly weaned piglets", Physiology and Behavior, Elsevier Science Ltd., Oxford, GB, vol. 99, No. 5, Apr. 19, 2010 (Apr. 19, 2010), pp. 579-586.

P.S. Jackett et al., "Virulence of *Mycobacterium tuberculosis* and Susceptibility to Peroxidative Killing Systems", Journal of General Microbiology (1978), 107, pp. 273-278.

Pruitt, K. M., and D. N. Kamau. "Quantitative analysis of bovine lactoperoxidase system components and of the effects of the activated system on bacterial growth and survival." *Indigenous antimicrobial agents of milk. Recent developments, Uppsala (Sweden)*, Aug. 31-Sep. 1, 1993. FIL-IDF. Secretariat general, 1994.

Connor W et al. Am. J Clin. Nutr. 1999, 69: 827-828.

International Search Report and Written Opinion dated Sep. 23, 2015 for PCT Application No. PCT/US2015/038612.

Griffiths ed. Improving the Safety and Quality of Milk: Milk Production and Processing Woodhead Publishing Series in Food Science, Technology and Nutrition (Apr. 21, 2010), p. 295.

International Search Report and Written Opinion dated Mar. 22, 2017 for International Application No. PCT/US2016/067683, 9 pages.

Extended European Search Report dated May 2, 2017 for European Application No. 17161383.9, 35 pages.

Mitsuru Kamiya et al: "Effects of feeding level of milk replacer on body growth, plasma metabolite and insulin concentrations, and visceral organ growth of suckling calves", Animal Science Journal, vol. 80, No. 6, Dec. 1, 2009, pp. 662-668, XP055194192, ISSN: 1344-3941, DOI: 10.1111/j.1740-0929.2009.00690.x.

Heinrichs et al. (Journal of dairy science, (Dec. 2003) vol. 86, No. 12, pp. 4064-4069).

Lombard Vet Clin Food Anim 27 (2011) 525-535.

"Yeast Cell Wall", European Association for Specialty Yeast Products, downloaded Nov. 5, 2015, 1 page.

Barabas, J. "An alternative method of milk treatment", http://www.fao.org/ag/aga/frg/feedback/war/v6200b/v6200bOt. htm. 5 pages, Sep. 13, 1994.

(56) References Cited

OTHER PUBLICATIONS

Better Crops, "Phosphorus in Animal Nutrition", Better Crops/vol. 83 (1999, No. 1), pp. 32-33.
de Halleux, V. et al. 'Variability in human milk composition: benefit of individualized fortification in very-low-birth-weight infants', The American Journal of Clinical Nutrition, 2013, vol. 98(suppl), pp. 529S-535S.
Elizondo-Salazar, J.A. et al., "Pasteurization of Non-Saleable Milk", Penn State Extension, Department of Animal Science, DSE 2013-187, originally published May 2007 as DAS 07-121, updated Aug. 23, 2013.
Examination Report dated Feb. 11, 2015 for Chilean Patent Application No. 2556-2012.
Examination Report dated Mar. 6, 2015 for Mexican Patent Application No. MX/a/2012/010741.
Godden, S. "A review of issues surrounding the feeding of waste milk and pasteurization of waste milk and colostrum", College of Veterinary Medicine, University of Minnesota, 13 pages, Sep. 24-26, 2005.
International Search Report and Written Opinion dated Jun. 3, 2016 for PCT Application No. PCT/US2016/021789.
International Search Report and Written Opinion dated May 12, 2016 for PCT Application No. PCT/US2016/019848.
Jorgensen, M. et al., "On-Farm Pasteurization of Milk for Calves", University of Wisconsin Dail)' Update, Dail)' Team Extension, pp. 1-3, Mar. 31, 2005.
JP 2002-544212-A, Dec. 24, 2002, English machine translation.
Manual on the Use of the LP-System in Milk Handling and Preservation, 1999, pp. 1-4.
Moore D. A. et al. 'Quality assessments of waste milk at a calf ranch', J. Dairy Sci. 2009, vol. 92, pp. 3503-3509.
Rochow, N. et al., 'Target Fortification of Breast Milk with Fat, Protein, and Carbohydrates for Preterrn Infants', The Journal of Pediatrics, 2013, vol. 163, No. 4, pp. I 001-1007.
Rudolph, Bryan, "Phytase use in pig feed: a real profitability boost", ALLABOUTFEED vol. 22, No. 8, 2014, pp. 22-24, Oct. 2014.
Sebastian, S. et al., "Apparent Digestibility of Protein and Amino Acids in Broiler Chickens Fed a Corn-Soybean Diet Supplemented with Microbial Phytase", Department of Animal Science, Macdonald Campus of McGill University, Dec. 1997;76(12): 1760-9.
Selia, Jane and Jose A. Teixeira, Engineering Aspects of Milk and Dariy Products, CRC Press, 2010, pp. 222.
Smith, Daniel L., Jr., et al. "The Effect of Mannan Oligosaccharide Supplementation on Body Weight Gain and Fat Accrual in C57BI/6J Mice", Obesity (Silver Spring), May 2010, 18(5): 995-999, doi: 10.1038/oby.2009.308.
Stone, Bill, "Waste milk, milk replacer or pasteurized waste milk", The Manager, Jun. 2004.
Yang et al. (Study on the Colostrum Preservation of Milk Cows by Utilizing the Lactoperoxidase System (May 2007, abstract) Guizhou Agricultural Sciences, May 2007 accessed Dec. 28, 2013.
Benefits and Potential Risks of the Lactoperoxidase System of Raw Milk Pasteurization (Report of an FAO/WHO technical meeting , FAO Headquarters, Rome, Italy Nov. 28-Dec. 2, 2005 (FAO report) ; ftp://ftp.fao.org/docrep/fao/009/a0729e/a0729e00.pdf accessed Feb. 13, 2017.
"Use of the Brix Refractometer for Monitoring Milk Total Solids and Colostrum Quality". Available online at www.milkproductsinc. com on Dec. 5, 2011. (Year: 2011).

"Pasteurized Milk Balancer". Available online at https://s3.amazonaws. com (Year: 2009).
Costello, "Milk Extenders and Fortifiers—with downloadable calculator" Available online at https://calfsessions.com/2012/05/milk-extenders-and-fortifiers-with-downloadable-calculator/, Jan. 2015. (Year: 2015).
D H Crews et al: "Journal of Animal Science", Animal Genetics: Division Editor Celi Biology S. Ellis Associate Editor Growth and Developmental Biology S. Johnson Calvert Associate Editor M. Estienne Associate Editor J. Matte Associate Editor J. O'Doherty, Jan. 1, 2012 (Jan. 1, 2012), p. 116, XP055426140, Retrieved from the Internet: URL:http://www.jtmtg.org/JAM/2012/abstracts/2012-JAMAbstracts.pdf [retrieved on Nov. 17, 2017].
European Office Action dated Nov. 22, 2017 for European Application No. EP13731012.4, 6 pages.
Gouveia et al. (Brazilian Journal of Microbiology 44, 2, 499-504 (2013)).
"The Science of Mixing Milk Replacer," from http://calfsessions. com/2013/06/science-mixing-milk-replacer-mixology-101/ (Year: 2013).
"K-Cal for Calves Energy Supplement," from https://www.savacaf. com/products/k-cal-for-calves-energy-supplement/ (Year: 2007).
"MIA-A," from https://www.mrclab.com/data/products/MIA-S-30_ OPR.pdf (Year: 2005).
Siemens et al., "Managing and Feeding Holstein Steers: Birth to 350 Lbs," U.S. Dept. of Agriculture, Univ. of Wisconsin-Extension, 1996 (6 pages).
Coverdale et al., "Effect of Various Levels of Forage and Form of Diet on Rumen Development and Growth in Calves," J. Dairy Sci., 2004, pp. 2554-2562, vol. 87.
Lacticheck, "RapiRead Milk Analyzer", www.pagepedersen.com/ products/milk-analyzers/lacticheck-lc01-rapiread; Accessed on Jun. 22, 2013., 2013.
Mexican Institute of IP, "First Office Action", Application No. MX/a/2015/003408, dated Jul. 30, 2018, 10 pages.
Mexican Institute of IP, "Second Office Action", Application No. MX/a/2015/003408, dated Nov. 29, 2018, 8 pages.
PCT, "International Search Report and Written Opinion", Application No. PCT/US2013/045189, dated Jul. 24, 2013, 8 pages.
Echternkamp, S.E., "Relationship between placental development and calf birth weight in beef cattle", Animal Reproduction Science, 32: 1-13, 1993.
Fao Animal Production and Health, "Rearing Young Ruminants on Milk Replacers and Starter Feeds", 2011, 1-79.
Euro Food Safety Auth., "Scientific opinion on the safety and efficacy of RonozymeHiPhos M/L (6-phytase) as a feed additive for poultry and pigs", EFSA Journal; 10(1):2527, 2012, 12 pages.
Tomkins, T. et al., "Milk replacer research leads to new developments", Feedstuffs, Oct. 10, 1994, pp. 13-15 and 23.
Office action received for Costa Rican Patent Application No. 2015-0556, dated Dec. 18, 2019, 18 pages including 7 pages of English translation.
Tomkins, et al., "55th Minnesota Nutrition Conference & Roche Technical Symposium", Bloomington, Minnesota; Sep. 19-21, 1994, Sep. 19, 1994, 308.
U.S. Appl. No. 14/645,071, filed Mar. 11, 2015.
U.S. Appl. No. 14/634,317, filed Feb. 27, 2015.
U.S. Appl. No. 14/215,604, filed Mar. 17, 2014.
U.S. Appl. No. 13/686,662, filed Nov. 27, 2012.
U.S. Appl. No. 13/837,693, filed Mar. 15, 2013.

* cited by examiner

MILK REPLACER PRODUCTS CONTAINING HALIDES AND SOURCES OF HYDROGEN PEROXIDE AND METHODS OF FEEDING SAME

TECHNICAL FIELD

The present disclosure relates to milk replacers comprising halides and sources of hydrogen peroxide and methods of feeding such milk replacers to young animals for improved animal performance.

BACKGROUND

Livestock animals are a commodity raised to produce food products including milk and meat. The time it takes livestock to mature, particularly to gain weight, is important when assessing whether the animal is ready to produce milk or is ready for market. A number of feeding systems have been used to enhance weight gain of livestock beginning at a young age and may include feeding techniques prior to and after weaning. Such techniques may involve providing milk replacers to the animals. Milk replacers generally mimic the milk produced from the post-partum parent animal in terms of protein, fat and carbohydrate content. Milk replacers have been employed for over 60 years to sustain and grow the young animals such as bovine calves. Providing nutrients to young animals through milk replacers may, for instance, reduce the age of freshening or the onset of lactation of a dairy cow, thereby reducing the cost of milk production. Increased weight gain of livestock from an early age by ingestion of milk replacer may also reduce the cost of beef production.

Work to determine the proper attributes for calf milk replacers has been conducted during the last several decades. In a prior approach, the Scottish Agricultural College (SAC) at Auchincruive developed milk replacer powder containing a functional lactoperoxidase ("LP") system to provide milk replacers with antimicrobial properties. Milk replacers otherwise do not contain antimicrobial proteins in active form. One method of milk replacer production in this prior approach involved control of time-temperature treatments employed during replacer manufacture to avoid denaturation of the LP system. Another involved extracting the LP system agent, lactoferrin, from milk or whey and dry mixing with other milk replacer components. However, these methods of producing milk replacers is costly and controlling the production conditions to maintain an active LP system presents challenges to efficient production of milk replacers.

In another approach disclosed in US 2011/0229598, the merit of using LP systems as a natural preservation mechanism in milk is disclosed. The method is used as a means to reduce pathogen load in pasteurized milk fed to calves. This natural preservation mechanism needs to be activated to be effective for this application.

In addition, milk replacers having an active LP system must contain components capable of sustaining the LP active system, and such components include whey protein, casein, whey protein concentrate and skim milk produced under rigid operating conditions that preserve the LP system. However, the availability these components is scarce.

SUMMARY

Provided herein are milk replacers and methods of feeding milk replacers containing halides and sources of hydrogen peroxide. Unlike prior approaches where an LP system is active in the milk replacer, the milk replacers of the present disclosure may be produced according to traditional methods where the LP system is inactivated, and the milk replacer may be combined with halides, peroxides or both, and fed to young animals to improve animal performance.

According to one implementation, a method involves feeding a young animal a milk product through weaning in which the milk product includes milk-based protein, a halide, such as iodide, and a source of hydrogen peroxide, such as hydrogen peroxide or percarbonate, which reduces into hydrogen peroxide. The milk product fed to the young animal does not contain an active lactoperoxidase system. In response to ingesting the milk product, the young animal decreases a feed to gain ratio. In some examples, the young animal is a calf. Under these circumstances, in response to ingesting the milk product, the calf may increase starter feed intake offered. In addition or alternatively, in response to ingesting the milk product, the calf may increase a rate of weight gain through weaning. A protein level may be about 20 to about 30 percent by weight of the milk replacer powder.

According to another implementation, a method of feeding a calf through weaning involves feeding a calf a milk replacer containing milk-based protein, a source of hydrogen peroxide and a halide. In the calf milk replacer, an active lactoperoxidase system is not present, and in response to ingesting the milk replacer, the calf may decrease a feed to gain ratio. Protein in the milk replacer may be milk-based protein, and a protein level of the calf milk replacer may be about 20 to about 30 percent by weight of the milk replacer powder. In some examples, the hydrogen peroxide source is present in the milk replacer at about 50 to about 500 parts per million by weight of the rehydrated milk replacer, and the halide is present at about 1 to about 50 parts per million by weight of the rehydrated milk replacer. In response to ingesting the calf milk replacer, the calf may increase starter feed intake. In addition or alternatively, in response to ingesting the calf milk replacer, the calf increases a rate of weight gain through weaning.

In yet another implementation, a hydrated calf milk replacer includes re-hydrated calf milk replacer powder, hydrogen peroxide at about 50 to about 500 parts per million by weight of the hydrated milk replacer and iodide at about 1 to about 50 parts per million by weight of the hydrated milk replacer, in this implementation, the calf milk replacer powder includes milk-derived protein and an active lactoperoxidase system is not present. Alternatively, hydrogen peroxide may be present at about 100 to about 300 parts per million by weight of the hydrated milk replacer, and the iodide may be present at about 1 to about 30 parts per million by weight of the hydrated milk replacer. Hydrogen peroxide may be derived from a combination of glucose and glucose oxidase, sodium percarbonate, and/or magnesium peroxide. A protein level of the milk replacer may be about 2.2 to about 5.1 percent by weight of the rehydrated milk replacer or about 18 to about 30 percent of the unhydrated milk replacer powder.

DETAILED DESCRIPTION

Figure 1:
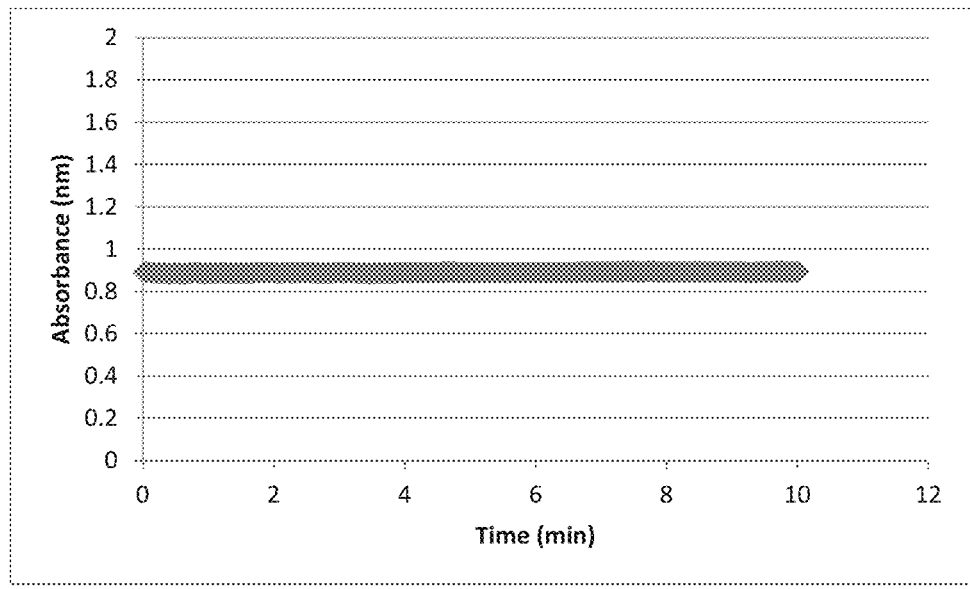
FIG. 1 is a graph illustrating the absorbance activity of a milk replacer produced according to traditional methods.

In evaluating the efficacy of active LP systems in milk, a reduction in dry feed intake in calves was unexpectedly observed. It was determined that this surprising event resulted from the activation of the LP system in milk through the addition of a halide and peroxide, the presence of which are necessary for the LP system to activate. Trials were conducted to better understand the reduction in dry feed or starter intake resulting from the active LP system in milk. In these trials, milk replacers were also tested to determine whether treatments with a halide and peroxide reduced dry feed intake. Contrary to expectations, it has been discovered that the combination of halide and hydrogen peroxide sources in milk replacers does not reduce performance of young animals, rather, the performance of the young animals is actually enhanced. This discovery is surprising because traditional milk replacers do not contain functional LP systems, and the addition of halide and hydrogen peroxide sources to milk products without functional LP systems was previously considered to not provide benefits.

Accordingly, the present disclosure provides milk replacers containing halides and sources of hydrogen peroxide and methods of feeding such milk replacers. The milk replacers may be produced according to traditional methods and admixed with the halides and sources of hydrogen peroxide during or after production.

While the products and methods of the present disclosure are described in relation to calf milk replacer and feeding calves these products, milk replacers may be produced for other young animals and be fed similarly to result in improved performance. Young animals may include, but are not limited to, other young ruminants in addition to calves such as young deer, goats (kids), sheep (lambs) and llamas; piglets and other young livestock animals; foals; young zoo animals; and young companion animals. These animals may ingest such milk replacers through weaning, which may vary between species. For instance, young ruminants may be weaned after about 12 weeks from birth, sometimes less.

Milk Replacer Compositions Containing Halides and Sources of Hydrogen Peroxide

Milk replacers of the present disclosure may include or be admixed with hydrogen peroxide and halide sources.

Sources of hydrogen peroxide may include hydrogen peroxide as well as compounds that decompose (reduce) into hydrogen peroxide or that react to form hydrogen peroxide. The preferred sources of hydrogen peroxide may be hydrogen peroxide and percarbonate. Hydrogen peroxide has antimicrobial properties, is generally recognized as safe (GRAS) and decomposes into water and oxygen gas. Percarbonates, such as sodium percarbonate (e.g., sodium percarbonate, $2Na_2CO_3 \cdot 3H_2O_2$), calcium percarbonate, and magnesium percarbonate are water soluble, anhydrous sources of hydrogen peroxide due to their reduction to hydrogen peroxide. Magnesium peroxide serves as a source of hydrogen peroxide due to its decomposition in water to hydrogen peroxide. Glucose and the glucose oxidase may be used to form a reaction product of hydrogen peroxide. Thus, hydrogen peroxide may be provided in its native form, in a pre-decomposed form (e.g., percarbonates) or potential (unreacted) form (e.g., unreacted glucose and glucose oxidase).

The sources of hydrogen peroxide may be provided in solid form, such as a powder or crystal. In addition or alternatively, a drip hydrogen peroxide application may be employed.

Hydrogen peroxide may be present at up to 500 parts per million by weight of the rehydrated milk replacer, at about 50 to about 500 parts per million by weight of the rehydrated milk replacer, at about 100 to about 300 parts per million by weight of the rehydrated milk replacer, at about 150 to 250 parts per million by weight of the rehydrated milk replacer, or at about 200 parts per million by weight of the rehydrated milk replacer. Rehydrated means, for instance, that milk replacer powder, water and any other components provided according to the present disclosure are combined. On a per calf basis, for example, 0.75 pounds of milk replacer powder is mixed with 4.25 pounds of water as well as any other components provided according to the present disclosure, resulting in approximately 5.0 pounds of rehydrated or hydrated milk replacer. In one example, 1.5 grams of 30% hydrogen peroxide may be used as the source of hydrogen peroxide. In this example, hydrogen peroxide may be present at about 200 parts per million of the hydrated milk replacer, where 0.45 grams hydrogen peroxide (i.e., 1.5 grams 30% hydrogen peroxide)/((5.0 pounds×454 g/pound=2270 grams of water and milk replacer)+(1.50 grams 30% hydrogen peroxide))=198.1 parts per million of the rehydrated milk replacer in solution. In other examples, more or less milk replacer powder containing or combined with peroxide and halide sources may be mixed with more or less water. For instance, 1.25 pounds of milk replacer powder may be mixed with 4 to 5 pounds of water or more.

In yet another example, the calf may be offered an amount of hydrogen peroxide on a grams per feeding basis. Calves may be offered about 0.25 to about 2.5 grams per feeding, about 0.25 to about 1.0 grams per feeding, about 0.25 to about 0.5 grams per feeding or about 0.45 grams per feeding.

In further examples, the calf may be offered an amount of a source of hydrogen peroxide on a daily basis. For instance, 30% hydrogen peroxide may be provided at a rate of about 0.5 to about 5.0 grams per day, about 2.5 to about 3.5 grams per head per day or about 3.0 grams per head per day.

Halides in milk replacers of the present disclosure may include fluoride, chloride, bromide, iodide or combinations thereof. The halide may be provided as a solid, such as a powder or crystal. For instance, the halide may be provided as a salt. Iodide may be used as the preferred halide component and may be in salt form, such as potassium iodide (KI). Other water-soluble salts, e.g., alkali metal and alkaline earth metal salts, such as sodium, potassium, magnesium or calcium may also be employed in combination with the halide. For instance, sodium chloride, potassium chloride, magnesium chloride, calcium chloride, sodium fluoride, potassium fluoride, magnesium fluoride, calcium fluoride, sodium bromide, potassium bromide, magnesium bromide, calcium bromide, sodium iodide, magnesium iodide and calcium iodide may also be used as the halide source. Halides (e.g., halide ions) may be present at 1 to 50 parts per million by weight of the rehydrated milk replacer, at about 1 to about 30 parts per million by weight of the rehydrated milk replacer, at about 1 to about 10 parts per million by weight of the rehydrated milk replacer, at about 1 to about 5 parts per million by weight of the rehydrated milk replacer, or at about 5 parts per million by weight of the rehydrated milk replacer.

The amount of halide offered to the calf may alternatively be expressed in milligrams per calf per day or in milligrams per kilogram of milk replacer power. In some cases, improvements in performance have been shown at feeding rates of about 6 to about 25 milligrams per calf per day, or in powder at rates of 9 milligrams to 28 milligrams per kilogram of milk replacer powder.

Milk replacers of the present disclosure may be produced according to traditional methods in which the fat and protein components of milk replacers are spray dried and combined into a milk replacer powder. Spray drying processes generally involve maintaining a spray dryer at temperatures between 100° C. to 200° C. so that the spray dried component rapidly heats and loses moisture. Following spray drying, the spray dried powder is subjected to a subsequent heating step, such as in a dryer drum, with an air temperature of between 100° C. to 200° C. in order to further reduce the moisture content of the powder. The heating steps involved in typical spray drying processes result in the inactivation of LP systems present in milk-derived components. The inactivation is irreversible as evidenced by the following experiment in which milk replacer samples were tested for lactoperoxidase activity. In the experiment, lactoperoxidase measurements and calculations were completed according to the International Dairy Federation Method (Pruitt and Kamal, 1993). Analysis was performed in triplicate for all treatments, including one raw milk sample (NCSU creamery) as a control. The testing process involved rehydrating the milk replacer powders at 10% powder concentration in water. ABTS stock solution (1 mM ABTS in 0.1 mM phosphate buffer at pH 6.0) was placed in a disposable plastic cuvette. Five µL of sample and hydrogen peroxide (0.3 mM) were subsequently added. The reaction was mixed thoroughly and absorbance recorded at 412 nm until the reaction reached a plateau or 10 minutes. Samples were quantified using least squares regression and Beer's law.

The results of the experiment are provided in Table 1.

TABLE 1

Lactoperoxidase activity in Control Milk and Powders

| Sample | LP (mg/L) |
|---|---|
| Raw milk control | 44 |
| Milk Replacer Sample 1 | ND |
| Milk Replacer Sample 2 | ND |
| Milk Replacer Sample 3 | ND |

ND—not detected

Figure 2:
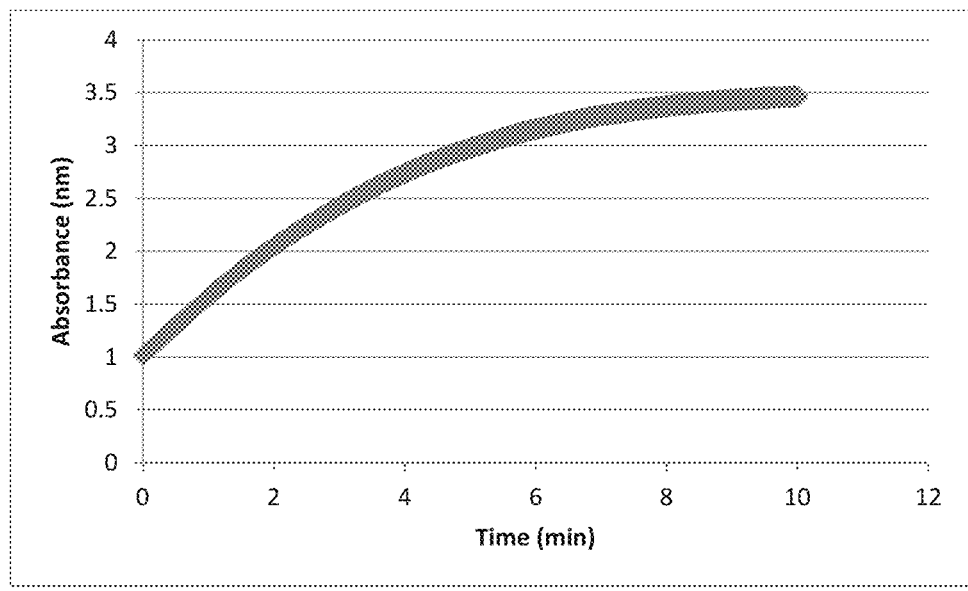
FIG. 2 is a graph illustrating the absorbance activity of raw milk.

The results of Table 1 show that no reaction occurred for the rehydrated milk replacer samples analyzed by lactoperoxidase assay methods. Further, as provided in FIGS. 1 and 2, there was no detectable change in absorbance for a milk replacer sample 2 (FIG. 1) as compared to the control sample (FIG. 2) in which reflectance increased over time due to the increasing LP activity in the raw milk control. The milk replacers used according to the present disclosure therefore contain irreversibly inactivated LP systems.

The nutrient profile of the milk replacers generally includes fat and protein. The fat content may range from about 2.25 to about 4.7 weight percent of the hydrated milk replacer or from about 15 to about 31 weight percent of the milk replacer powder. Predominant fat sources may be lard, tallow, palm kernel or coconut oils, alone or in combination. In addition, some fat from lecithin and residual fat (e.g., butter fat, milkfat or both) may contribute to the fat content in milk replacers. The level of fat content may be tailored to a target animal, and for instance, calf milk replacers may have the aforementioned fat content of between about 15 and about 31 weight percent of the powder. In a more particular example, traditional calf milk replacers may include protein from about 20 to about 25 weight percent of the powder or about 3 to about 3.75 weight percent of the hydrated milk replacer, and full potential calf milk replacers may include protein from about 25 to about 31 weight percent of the powder or about 3.75 to about 4.7 weight percent of the hydrated milk replacer.

Protein in milk replacers typically ranges from about 2.2 to about 5.1 weight percent weight of the hydrated milk replacer or about 18 and about 30 weight percent of the powder. Protein may be sourced from milk, animal (e.g., plasma, egg and red blood cells) and vegetable sources and combinations thereof. In some implementations, the protein in milk replacer may be all milk protein. Milk-derived protein sources are generally referred to as milk proteins and may include whey, whey products such as whey protein concentrate and delactosed whey, casein, skim milk, sodium caseinate and calcium caseinate. Alternatively, non-milk proteins, such as vegetable proteins (e.g., soy protein), animal protein, and single cell proteins, may be included as a protein source in the milk replacer. Non-milk protein may account for up to from about 0 to about 65 percent, from about 50 to about 65 percent, or up to or at about 50 or about 65 percent of the total protein content, with the balance of protein derived from milk protein; meaning milk protein may account for 100 percent, about 1 to about 35 percent, about 35 to about 50 percent, up to about 50 percent, or about 35 percent of the total protein content in the milk replacer. For traditional calf milk replacers, the protein content may be about 22 weight percent of the powder or about 3.3 weight percent of the rehydrated milk replacer, and milk replacers formulated for enhanced performance, such as full potential milk replacers, may include protein at about 26 to about 28 percent of the powder or about 3.9 weight percent to about 4.8 weight percent of the rehydrated milk replacer.

Methods of Feeding Milk Replacers Containing Halides and Sources of Hydrogen Peroxide Generally, animals are offered a fixed amount of milk replacer per day, which may form all or a portion of the young animal's daily feed ration. Prior to the onset of weaning, the milk replacer in the feed ration may be offered twice per day, and may generally be divided into equal parts.

Milk replacers may be fed in traditional settings at a rate of about 1.25 pounds per day during the first week of life. Thereafter, the animal may be offered about 1.5 pounds of milk replacer per head per day. At the onset of weaning, the animal may be offered one feeding per day, totaling about 0.75 pounds of milk replacer per head per day.

In enhanced feed settings, full potential milk replacers may be fed at a rate of at least about 1.6 pounds up to about 3.0 pounds per head per day. For instance, in the first week of life, young animals, such as calves, in a full potential setting may be offered about 1.6 pounds or more (e.g., up to about 1.9 pounds) of milk replacer per head per day on a milk replacer powder basis. From the second week of life onward, such animals in a full potential setting may be offered the same amount (about 1.6 pounds) of milk replacer or may be offered up to 3.0 pounds of milk replacer per head per day. Thereafter, the amount of milk replacer offered to the young animal may be maintained or the level may decrease, for example, depending on the timing of the onset of weaning.

According to the present disclosure, prior to feeding young animals, the milk replacers are hydrated with water or another aqueous material. The hydrogen peroxide and/or halide sources may be added to the milk replacers prior to rehydration, and under these circumstances, it may be preferable to provide the hydrogen peroxide and halide sources in solid form. For instance, the powdered milk replacer may be combined with solid hydrogen peroxide and/or halide sources at the time of production, e.g., when different nutrient powders are combined to form a milk replacer. Alternatively, the hydrogen peroxide and/or halide sources may be combined in the milk replacer by a producer or nutritionist. In this regard, pre-measured amounts of hydrogen peroxide and/or halide sources may be provided for combining with calf milk replacers prior to feeding. Alternatively, the hydrogen peroxide and halide sources may be in aqueous form and may be added to the milk replacer during or prior to rehydration, and may also be provided in pre-measured containers. Upon hydration of the milk replacer containing the hydrogen peroxide and halide sources using water, the source of hydrogen peroxide and/or the halide may react, for instance, resulting in the reduction of the hydrogen peroxide to water and oxygen gas. With iodide as the halide and hydrogen peroxide as the source of hydrogen peroxide in an aqueous solution, the following exothermic reaction may occur:

$$2H_2O_2(aq) = 2H_2O(l) + O_2(g) + heat \quad (1)$$

More particularly, reaction 1 for the oxidation-reduction of hydrogen peroxide in the presence of iodide ion occurs in two steps (1a) and (1b):

$$H_2O_2(aq) + I^-(aq) = H_2O(l) + OI^-(aq) \quad (1a)$$

$$H_2O_2(aq) + OI^-(aq) = H_2O(l) + O_2(g) + I^-(aq) \quad (1b)$$

In the hydrated milk replacer, the water generated from the decomposition of the hydrogen peroxide and the iodide ions remain in the milk replacer, while the oxygen gas and heat generated may dissipate therefrom. Due the LP in milk replacer being denatured, the preceding reaction may occur slowly or at a greatly reduced rate.

Using sodium percarbonate as the source of hydrogen peroxide in an aqueous solution, the following exothermic reaction may occur:

$$2Na_2CO_3 \cdot 3H_2O_2 \rightarrow 2Na_2CO_3 + 3H_2O_2 \quad (2)$$

Using iodide as the halide, the oxidation reduction of the hydrogen peroxide proceeds according to steps (1a) and (1b) above. Other hydrogen peroxide and halide sources may be provided according to the present disclosure and the above examples are not intended to be limiting. Moreover, the present disclosure is not limited to sources of hydrogen peroxide soluble in water, and may include hydrogen peroxide sources soluble in acids. For instance, calcium peroxide in the presence of an edible acid, is reduced to hydrogen peroxide.

In addition to milk replacer, starter feed may be offered to the young animals on an ad libitum basis. Starter feeds, such as calf starter feeds, may include a mixture of one or more of corn, soybean meal, wheat middlings, oats, molasses, fat, ground cotton seed hulls, distillers grains, calcium carbonate, salt, and macronutrients and micronutrients. The starter feed may contain about 45 to 50 percent coarse ingredients such as corn, soy and oats; about 16-22 percent protein; about 2 to 3 percent fat; about 5 to 6 percent fiber (determined on a NIR basis); about 7 percent acid detergent fiber; about 6 percent molasses; and the balance including a mixture of other nutrients.

Ingestion of milk replacers containing combinations of halides and sources of hydrogen peroxide by young animals according to the present disclosure has been found to improve performance. For instance, young animals may decrease a feed to gain ratio such that less feed is consumed to increase weight gain, may increase intake of starter feed, may reduce feed refusal of milk replacer, and/or may increase weight gain. Improved performance may result in reduction of the age of freshening or the onset of lactation, thereby reducing the cost of milk production; or may cause the animal to increase weight gain from early age, which may reduce the cost of beef production.

Implementations of the present disclosure are more particularly described in the following calf trials that are for illustrative purposes only. Numerous modifications and variations are within the scope of the present disclosure as will be apparent to those skilled in the art.

Examples

Calf Trial 1

Sixty calves were sourced from Wisconsin and shipped to Northwest Iowa, ranged in age from 2 to 5 days and weighed approximately 95 pounds. Blood samples (serum protein) were collected from all animals at arrival to ensure that colostrum was consumed and the Ig status was similar. Calves were randomized to treatment on a weight and serum protein basis (% as measured by Zinc Sulfate Turbidity and assigned to 1 of 5 ranges: 0.00-0.49, 0.50-0.99, 1.00-1.49, 1.50-2.49, and 2.50 or higher).

Fifteen calves were allotted to each of four treatments where each was offered all milk protein milk replacer (22% protein, 20% fat) with respective treatments. Treatments included: no added iodide or hydrogen peroxide (Control); iodide at 0.011 g per calf, per feeding (Iodide); 1.45 g of 30% hydrogen peroxide per calf, per feeding (Hydrogen peroxide); or the combination of added iodide at 0.011 g per calf, per feeding and 30% hydrogen peroxide at 1.45 g per calf, per feeding (Combination). Iodide was sourced from Sciencelab.com, Inc. Houston, Tex., and hydrogen peroxide was sourced from RICCA Chemical Company, Arlington, Tex. and were added to the milk replacer after hydration of the milk replacer and just prior to feeding. Calves were fed 0.75 lbs milk replacer twice daily (1.50 lbs/day) for days 1-34, then once daily through day 41. Milk replacers were produced according to traditional methods, meaning an active lactoperoxidase system was not present in the milk replacer fed to the calves. A 20% protein calf starter was fed to all calves beginning week 1.

Table 2 lists calf weights, milk replacer, starter (dry feed) and health measurements, which were taken weekly and summarized at the conclusion of Calf Trial 1.

TABLE 2

Performance of Calves fed control milk replacer and milk replacer supplemented with iodide, hydrogen peroxide and both iodide and hydrogen peroxide

| Treatment | Control | Iodide | Hydrogen peroxide | Combination | SE |
|---|---|---|---|---|---|
| Number Calves | 15 | 15 | 15 | 15 | |
| Initial $Ig^E$ | 3.80 | 3.71 | 3.79 | 3.93 | 0.31 |
| Weight, lbs. | | | | | |
| Initial | 95.8 | 95.2 | 95.1 | 95.7 | 0.94 |
| Final (wk 6) | 132.6a | 130.4a | 136.5ab | 147.1b | 3.76 |
| Avg. Period Gain, lbs. | | | | | |
| Week 1 | 1.67 | 0.06 | 1.94 | 1.57 | 1.06 |
| Week 2 | 1.25a | 1.71a | 3.16ab | 5.19b | 0.94 |
| Week 3 | 3.00a | 3.66ab | 3.05a | 5.26b | 0.75 |
| Week 4 | 12.53 | 11.90 | 12.48 | 14.96 | 1.10 |
| Week 5 | 6.39 | 5.80 | 6.41 | 8.73 | 1.11 |
| Week 6 | 11.95a | 12.04a | 14.31ab | 15.71b | 1.21 |
| Total Gain | 36.80a | 35.17a | 41.34ab | 51.43b | 3.92 |
| Period Dry Feed Consumption, lbs. (DM Basis) | | | | | |
| Week 1 | 0.34ab | 0.25a | 0.37ab | 0.56b | 0.10 |
| Week 2 | 1.52 | 1.21 | 1.83 | 2.24 | 0.37 |

TABLE 2-continued

Performance of Calves fed control milk replacer and milk replacer supplemented with iodide, hydrogen peroxide and both iodide and hydrogen peroxide

| Treatment | Control | Iodide | Hydrogen peroxide | Combination | SE |
|---|---|---|---|---|---|
| Week 3 | 2.77ab | 2.30a | 2.73ab | 3.8 lb | 0.47 |
| Week 4 | 6.02ab | 5.14a | 5.43a | 7.94b | 0.86 |
| Week 5 | 8.49 | 7.21 | 7.71 | 10.33 | 1.16 |
| Week 6 | 15.48ab | 13.96a | 15.55ab | 18.77 | 1.47 |
| Total Dry Feed Cons. | 34.61ab | 30.06a | 33.61ab | 43.65b | 4.09 |
| Total MR Consumption/calf, lbs. (DM Basis) | 52.64 | 53.12 | 53.61 | 54.28 | 0.90 |
| Average Feed:Gain | 2.48ab | 2.77b | 2.39ab | 1.95a | 0.19 | a, b, c Means in the same row not followed by a common letter differ (p < .05) using LSD procedure.

The results in Table 2 show that milk replacer containing the combination of added iodide and hydrogen peroxide when fed to calves on a daily basis significantly improved (p<0.05) total gain compared to the control treatment which did not receive supplemental iodide and hydrogen peroxide. For instance, after six weeks, the calves ingesting the combination of added iodide and hydrogen peroxide weighed 40 percent more than the calves ingesting the control treatment. It appears that calves utilized more energy for growth and gain when ingesting the combination diet. In addition, milk replacer consumption of the combination diet was similar to the level of consumption for the control diet, meaning the calves did not increase feed refusal due to the presence of added iodide and hydrogen peroxide.

With respect to weekly gain, calves ingesting the combination of added iodide and hydrogen peroxide increased weekly weight gain compared to the control group. During weeks 2 and 3 of the trial, calves ingesting the combination diet significantly improved (p<0.05) weekly gain for two consecutive weeks, and significantly improved (p<0.05) gain for week 6.

Dry feed intake tended to be enhanced (p<0.20), with the calves ingesting the combination of added iodide and hydrogen peroxide ingesting at least about 25 percent more starter than the calves ingesting the control treatment.

Feed efficiency (Feed:Gain) for total feed ingested tended to be enhanced (p<0.20), with calves ingesting the combination of added iodide and hydrogen peroxide increased efficiency by at least about 20 percent compared to the calves in the control treatment.

Health criteria, e.g., scour scores, of calves offered added iodide and/or hydrogen peroxide were not affected (p>0.20).

Calf Trial 2

The number of calf observations per treatment (15) in Calf Trial 1 prevented significance from being noted for starter intake and feed efficiency (control vs. iodide—hydrogen peroxide combination treatment). To resolve this concern, twenty calves were assigned to each, the control and the iodide and hydrogen peroxide combination treatments this trial Like treatment data from both Trials 1 and 2 was pooled to better understand the benefit of the additives. Calves were sourced, fed, housed and treated in a fashion similar to that in Calf Trial 1. An active lactoperoxidase system was not present in the milk replacer fed to the calves. Pooled data for these two treatments are presented in Table 3.

TABLE 3

Performance of calves fed control milk replacer and milk replacer supplemented with a combination of iodide and hydrogen peroxide

| | Treatment | | | |
|---|---|---|---|---|
| | Control | Combination | P Value | SE |
| Number calves | 35 | 35 | | |
| Initial Ig | 3.71 | 3.58 | 0.67 | 0.21 |
| Initial Weight | 97.58 | 97.81 | 0.85 | 0.87 |
| Weight wk 6 | 137.18 | 145.82 | <.01 | 2.22 |
| Avg. Period Gain, lbs. | | | | |
| Week 1 | 1.95 | 1.38 | 0.55 | 0.68 |
| Week 2 | 3.16 | 4.91 | 0.02 | 0.52 |
| Week 3 | 6.44 | 7.42 | 0.41 | 0.85 |
| Week 4 | 10.11 | 12.00 | 0.08 | 0.75 |
| Week 5 | 8.11 | 9.73 | 0.09 | 0.68 |
| Week 6 | 9.83 | 12.57 | 0.04 | 0.92 |
| Total Gain | 39.60 | 48.01 | <.01 | 2.22 |
| Avg. Period Dry Feed Consumption, lbs. (DM Basis) | | | | |
| Week 1 | 0.36 | 0.46 | 0.20 | 0.05 |
| Week 2 | 1.48 | 1.89 | 0.13 | 0.19 |
| Week 3 | 3.02 | 3.49 | 0.30 | 0.32 |
| Week 4 | 5.82 | 6.83 | 0.19 | 0.55 |
| Week 5 | 7.56 | 8.89 | 0.22 | 0.76 |
| Week 6 | 14.93 | 16.97 | 0.14 | 0.98 |
| Total Dry Feed Cons. | 33.18 | 38.54 | 0.15 | 2.58 |
| Avg. Period MR Consumption, lbs. (DM Basis) | | | | |
| Total CMR | 54.59 | 54.89 | 0.70 | 0.55 |
| Overall Feed:Gain | 2.30 | 2.05 | 0.02 | 0.07 |

The pooled data of Table 3 confirms the improved total gain benefit of iodide and hydrogen peroxide supplementation to milk replacer (p<0.01). Due to this increased gain, calves assigned to the additive treatment were over 8.6 pounds heavier (or over 5 percent) after 6 weeks (p<0.01), and gained at least 20 percent more weight. In addition, milk replacer consumption of the combination diet was similar to the level of consumption for the control diet, meaning the calves did not increase feed refusal due to the presence of added iodide and hydrogen peroxide.

With respect to weekly gain, calves ingesting the combination of added iodide and hydrogen peroxide increased weekly weight gain compared to the control group. During weeks 2 and 6 of the trial, calves ingesting the combination diet significantly improved (p<0.05) weekly gain. In addition, weekly gain tended to be enhanced (p<0.20) for three consecutive weeks over weeks 4 through 6.

Weekly dry feed intake tended to be enhanced (p<0.20) for the combination group during weeks 2, 4 and 6. A trend was noticed for increased total dry feed consumption (p=0.15) by feeding the combination diet with the calves in the combination group ingesting at least about 15 percent more starter than the calves ingesting the control treatment.

Additionally, overall feed efficiency was improved by use of the combination diet (p=0.02), with calves ingesting the combination diet increasing efficiency by at least about 10 percent compared to the calves in the control treatment.

Again, health parameters, e.g., scour scores, of calves were not different between treatments (p>0.20).

While the present disclosure provides various ranges, it will be understood that values, such as numeric integer values, at or within these ranges, or various ranges within the disclosed ranges, or ranges beginning or ending at a range value and beginning or ending at a value within the disclosed ranges may be used in particular embodiments without departing from the invention. For example, the percentage of saturated fat by weight of the total fat content within the animal feeds of the present disclosure may include any integer value from about 50 to about 100. In another example, the percentage of saturated fat by weight of the animal feed of the present disclosure may include any integer value from about 20 to about 55.

Although the present disclosure provides references to preferred embodiments, persons skilled in the art will recognize that changes may be made in form and detail without departing from the spirit and scope of the invention.

What is claimed is:

1. A method of feeding a young ruminant, the method comprising:
    feeding the young ruminant about 0.75 pounds to about 3.0 pounds per day of a dried milk replacer rehydrated in water, the milk replacer comprising milk-based protein, and iodide and a pre-decomposed source of hydrogen peroxide having antibacterial system properties, wherein the pre-decomposed source of hydrogen peroxide is present in the hydrated milk replacer at about 50 to about 300 parts per million by weight, and the iodide is present in the hydrated milk replacer at about 1 to about 50 parts per million by weight,
    wherein an active lactoperoxidase system is not present in the milk replacer,
    wherein the iodide and the pre-decomposed source of hydrogen peroxide are combined with the milk replacer, and
    wherein in response to ingesting the rehydrated milk replacer, the young ruminant decreases a feed to gain ratio compared to a young animal fed the same amount of the milk replacer but which is free of the iodide and the pre-decomposed source of hydrogen peroxide.

2. The method of claim 1, wherein the pre-decomposed source of hydrogen peroxide comprises one or more of sodium percarbonate or magnesium peroxide.

3. The method of claim 1, wherein the milk replacer comprises a protein level of about 2.2 to about 5.1 percent by weight of the rehydrated milk replacer.

4. The method of claim 1, wherein the protein in the milk replacer is milk-based protein.

5. The method of claim 1, wherein the young ruminant is a calf.

6. The method of claim 5, wherein in further response to ingesting the milk replacer, the calf increases a rate of weight gain through weaning.

7. The method of claim 5, wherein the method further comprises feeding the calf a calf starter, and wherein in further response to ingesting the milk replacer, the calf increases starter feed intake.

8. A method of feeding a calf through weaning, comprising:
    feeding the calf through weaning about 0.75 pounds to about 3.0 pounds per day of a calf milk replacer comprising milk-based protein, and a pre-decomposed source of hydrogen peroxide and a halide having antibacterial system properties,
    wherein the pre-decomposed source of hydrogen peroxide is present in the milk replacer at about 50 to about 300 parts per million by weight of the hydrated milk replacer, and the halide is present in the milk replacer at about 1 to about 50 parts per million by weight of the hydrated milk replacer,
    wherein an active lactoperoxidase system is not present in the milk replacer,
    wherein the halide and the pre-decomposed source of hydrogen peroxide are combined with the milk replacer, and
    wherein in response to ingesting the milk replacer, the calf decreases a feed to gain ratio compared to a calf fed the same amount of the milk replacer but which is free of the halide and the pre-decomposed source of hydrogen peroxide.

9. The method of claim 8, wherein the calf milk replacer comprises a protein level at about 2.2 to about 5.1 percent by weight of the rehydrated milk replacer.

10. The method of claim 8, wherein the pre-decomposed source of hydrogen peroxide comprises one or more of sodium percarbonate or magnesium peroxide.

11. The method of claim 8, wherein the halide is iodide.

12. The method of claim 8, wherein the method further comprises feeding the calf a calf starter, and wherein in further response to ingesting the calf milk replacer, the calf increases starter feed intake.

13. The method of claim 8, wherein in further response to ingesting the calf milk replacer, the calf increases a rate of weight gain through weaning.

14. A daily ration of a hydrated calf milk replacer comprising water, about 0.75 pounds to about 3.0 pounds of a calf milk replacer powder and a pre-decomposed source of hydrogen peroxide at about 50 to about 300 parts per million by weight of the hydrated milk replacer and iodide at about 1 to about 50 parts per million by weight of the rehydrated milk replacer, the pre-decomposed source of hydrogen peroxide and the iodide having antibacterial system properties,
    wherein an active lactoperoxidase system is not present in the milk replacer,
    wherein the calf milk replacer powder comprises milk-derived protein, and
    wherein the iodide and the pre-decomposed source of hydrogen peroxide are combined with the milk replacer.

15. The hydrated calf milk replacer of claim 14, wherein the iodide is present at about 1 to about 30 parts per million by weight.

16. The hydrated calf milk replacer of claim 14, wherein the pre-decomposed source of hydrogen peroxide is derived from one or more of sodium percarbonate, magnesium peroxide or a combination thereof.

17. The hydrated calf milk replacer of claim 14, wherein the hydrated calf milk replacer comprises a protein level of about 2.2 to about 5.1 percent by weight.

18. The method of claim 1, wherein the iodide and the pre-decomposed source of hydrogen peroxide are combined with the milk replacer during rehydration or immediately prior to feeding.

* * * * *

UNITED STATES PATENT AND TRADEMARK OFFICE
CERTIFICATE OF CORRECTION

| | |
|---|---|
| PATENT NO. | : 11,213,051 B2 |
| APPLICATION NO. | : 14/322604 |
| DATED | : January 4, 2022 |
| INVENTOR(S) | : Musser et al. |

It is certified that error appears in the above-identified patent and that said Letters Patent is hereby corrected as shown below:

In the Claims

In Column 11, Line 49, Claim 7 insert --feed-- after feeding the calf a calf starter In Column 11, Line 51, Claim 7 insert --intake of the calf-- after increases In Column 11, Line 51, Claim 7 delete ""intake"" after starter feed In Column 12, Line 24, Claim 12 insert --feed-- after feeding the calf a calf starter In Column 12, Line 26, Claim 12 insert --intake of the calf-- after increases In Column 12, Line 26, Claim 12 delete ""intake"" after starter feed Signed and Sealed this
Twenty-sixth Day of April, 2022

Katherine Kelly Vidal
*Director of the United States Patent and Trademark Office*